US 8,296,388 B2

(12) United States Patent
Blagsvedt et al.

(10) Patent No.: US 8,296,388 B2
(45) Date of Patent: Oct. 23, 2012

(54) CROSS-APPLICATION ENCODING OF GEOGRAPHICAL LOCATION INFORMATION

(75) Inventors: Sean O. Blagsvedt, Bangalore (IN); Kentaro Toyama, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1235 days.

(21) Appl. No.: 11/335,835

(22) Filed: Jan. 18, 2006

(65) Prior Publication Data

US 2007/0016651 A1    Jan. 18, 2007

(30) Foreign Application Priority Data

Jul. 18, 2005   (IN) ........................... 1861/DEL/2005

(51) Int. Cl.
  *G06F 15/16*   (2006.01)
  *G06F 17/00*   (2006.01)
  *G06F 13/28*   (2006.01)
  *G06K 9/20*    (2006.01)
(52) U.S. Cl. ......... 709/217; 707/602; 345/570; 382/284
(58) Field of Classification Search .................. 709/223, 709/226, 217–219; 701/213; 707/202, 114
See application file for complete search history.

(56) References Cited

U.S. PATENT DOCUMENTS

| | | | |
|---|---|---|---|
| 6,343,290 B1 * | 1/2002 | Cossins et al. ........................ 1/1 |
| 2001/0047393 A1 * | 11/2001 | Arner et al. .................... 709/216 |
| 2002/0095605 A1 * | 7/2002 | Royer et al. ................... 713/201 |
| 2003/0069693 A1 * | 4/2003 | Snapp et al. ................... 701/213 |
| 2004/0198389 A1 * | 10/2004 | Alcock et al. ................ 455/456.1 |
| 2005/0033513 A1 * | 2/2005 | Gasbarro ....................... 701/213 |
| 2005/0182770 A1 * | 8/2005 | Rasmussen et al. ............ 707/10 |
| 2005/0207672 A1 * | 9/2005 | Bernardo et al. ............. 382/284 |
| 2005/0278371 A1 * | 12/2005 | Funk et al. .................... 707/102 |
| 2006/0184679 A1 * | 8/2006 | Izdepski et al. ............... 709/229 |

FOREIGN PATENT DOCUMENTS

WO   WO 2006039889 A1 *   4/2006

OTHER PUBLICATIONS

Yasumura—S, Ikezaki—M, Watanabe—T, Ushiama—T.;Event—centralized management of geographic information collected from blog.;20070000;Springer—Verlag, Berlin, Germany..;2007049.;pt. 2, p. 769-76,.*
Wayfaring, Copyright 2006 Wayfaring Media (2 pages) http://www.wayfaring.com/ [Accessed Jan. 18, 2006]. foundcity (1 page) http://www.foundcity.net [Accessed Dec. 28, 2006].
Mie's Toykyo Tidbits: First Posting with GPS!, May 2003 (3 pages) http://tokyotidbits.com/mie/archives/000186.html [Accessed Dec. 28, 2006].
Google Maps API, "Put Google Maps on Your Own Web Site," Copyright 2006 Google (2 pages) http://www.google.com/apis/maps/.

* cited by examiner

*Primary Examiner* — Ashok Patel
*Assistant Examiner* — Evans Desrosiers
(74) *Attorney, Agent, or Firm* — Perkins Coie LLP

(57) ABSTRACT

A facility for cross-application encoding of geographical location information is described. In various embodiments, the facility receives a first document containing information relating to a geographical area, displays an image representing the geographical area, receives input from a user identifying at least a geographical location that is located in the geographical area, encodes a portion of the input to create an encoded link to the geographical location, and causes the link to be added to a second document such that when the link is selected, the first application displays the geographical area and identifies the identified geographical location. In various embodiments, the facility includes a correlating server that correlates geographical locations identified in documents of a first document type with documents containing mapping information.

14 Claims, 12 Drawing Sheets

Blog

Kentaro    Jan. 8

I'm going to be in Redmond next week.

Sean    Jan. 9

Click on this link to find my favorite coffee shop:

http://virtualearth.msn.com&lat=012345&long=987654&ID=121234

330

*FIG. 3C*

CROSS-APPLICATION ENCODING OF GEOGRAPHICAL LOCATION INFORMATION

CROSS-REFERENCE TO RELATED APPLICATION(S)

This patent application claims the benefit of Indian Provisional Patent Application Serial No. 1861/DEL/2005, filed on Jul. 18, 2005, and entitled "Cross-Application Geocoding User Interface," which is incorporated herein in its entirety by reference.

BACKGROUND

Users sometimes identify geographical locations of interest to them and other people, such as in a Web log ("blog"), discussion group, or other document. Although "blog" generally refers to a Web-based publication, the term "blog" is commonly used in the art as both a noun (e.g., a document or set of documents) and a verb (e.g., the act of creating such a document). One or more users may add entries ("postings") to a blog. Various Internet web sites provide blog services and tools, such as MSN Spaces. As an example, a user may blog about a restaurant near 85$^{th}$ Street and Greenwood Avenue, a theater in downtown Seattle, a recent football game at a local park, or any other topic.

While geographical locations are conventionally identified using street intersections, mailing addresses, directions, and the like, increasing use of digital mapping and satellite technology makes it possible to accurately identify geographical locations using other means, such as latitude/longitude, GPS coordinates, and so forth. However, users cannot share accurate geographical locations, such as between applications or documents in a meaningful way. As an example, a user cannot easily append an accurate geographical location to a blog or display on a map or satellite image a collection of geographical locations identified in a blog.

SUMMARY

A facility for cross-application encoding of geographical location information is described. A user can identify a geographical location in a mapping application, provide a description relating to the identified geographical location, and indicate another application, such as a discussion application, that should receive an encoding of the identified geographical location and description. The facility adds the encoded geographical location and description to a document associated with the other application (e.g., the discussion application). The facility can additionally retrieve encoded geographical location information from one or more documents of an application, such as the discussion application, and provide indications of the encoded geographical location information to a mapping application so that the mapping application can identify the geographical locations on a map or satellite image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A-3D are display diagrams illustrating examples of a user interface of the facility in various embodiments.

DETAILED DESCRIPTION

Figure 1:
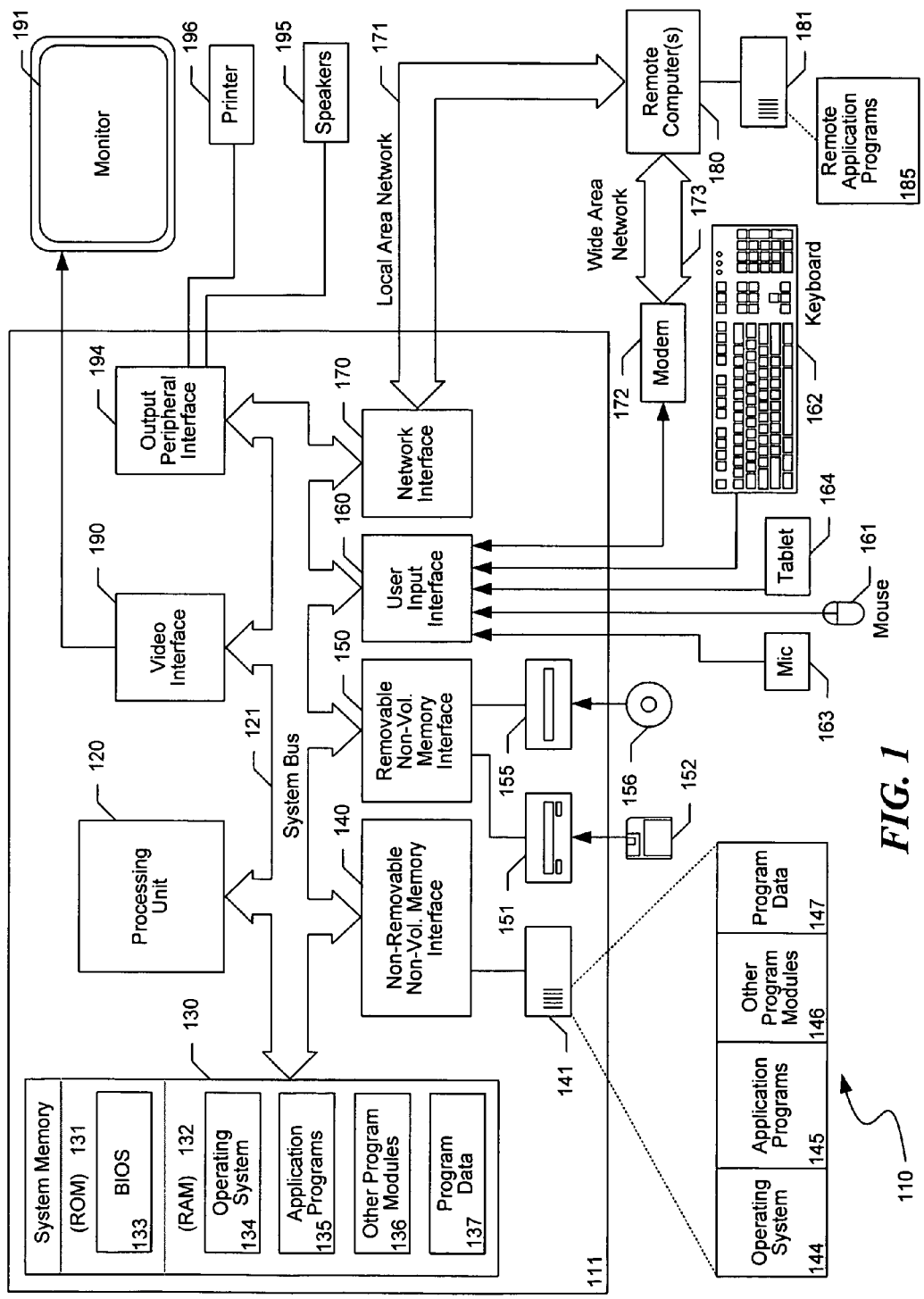
FIG. 1 is a block diagram illustrating an example of a suitable computing system environment or operating environment in which the techniques or facility may be implemented.

A facility for cross-application encoding of geographical location information is described. In various embodiments, a user can identify a geographical location in an application such as a mapping application, provide a description relating to the identified geographical location, and indicate another application, such as a discussion application or a blog, that should receive an encoding of the identified geographical location and description. The facility adds the encoded geographical location and description to a document associated with the other application (e.g., the discussion application). In various embodiments, the facility additionally retrieves encoded geographical location information from one or more documents of an application, such as the discussion application, and provides indications of the encoded geographical location information to a mapping application so that the mapping application can identify the geographical locations on a map or satellite image. The facility can also indicate any descriptions or other attributes associated with the geographical location or the user's view of the geographical area containing the geographical location. A specific example follows.

Using the facility, a user can identify a geographical location, such as by indicating a position of a satellite image when using a mapping application. An example of a mapping application is MICROSOFT's MSN VIRTUAL EARTH online mapping and satellite imagery application or web site. The mapping application provides information that a browser can use to display an image of a geographical area such as a map or satellite image. Upon identifying a geographical location (e.g., the user's house, favorite coffee shop, etc.), the user can provide a description that can appear in the user's blog and an indication of the user's blog (e.g., an MSN Spaces identifier ("space ID") or a uniform resource locator ("URL") at which the blog can be found). The facility then encodes the identified geographical location and optionally the description. The facility can also encode various other attributes, such as a zoom level at which the user is viewing the map or satellite image. As an example, the facility can encode the geographical location and description as parameters of a URL that, when loaded in a browser, suggest a blog posting based on the geographical location and description. The user can then edit the suggested blog posting and complete the blog posting so that when the user (or others) view the blog, a posting in the blog indicates the geographical location and description and provides a link. If the user viewing the blog selects the link, the mapping application opens (e.g., in a browser) and displays the indicated location and description. In some embodiments, the mapping application additionally retrieves additional locations indicated in the blog and identifies the additional locations and descriptions. Thus, for example, users viewing the blog may be able to see all geographical locations that are identified in the blog. As an example, the blog may contain a set of interesting geographical locations to visit, shop at, dine in, etc., in a geographical area near the identified geographical location. In some embodiments, the mapping application additionally retrieves additional locations indicated in several blogs, such as blogs of an identified community of bloggers (e.g., blogs of users in a buddy list). These multiple blogs may be located on more than one computing device.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 111 typically includes a variety of computer-readable media. Computer-readable media can be any available media that can be accessed by the computer 111 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 111 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 111. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 111 is incorporated, such as in a tablet-type personal computer. In addition, computing devices such as the computer 111 may also include other peripheral output devices such as speakers 195 and a printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
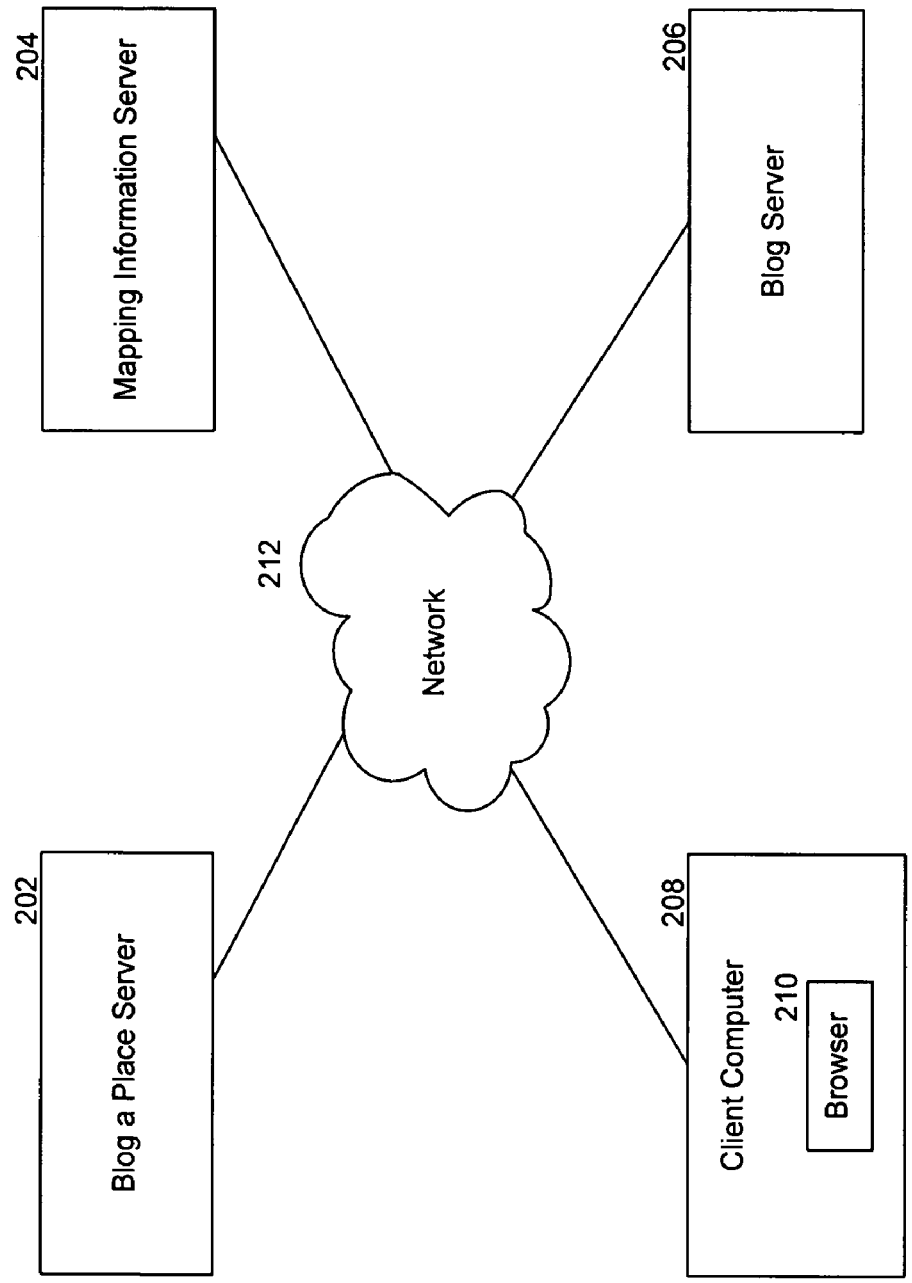
FIG. 2 is a block diagram illustrating components of the facility in various embodiments.

FIG. 2 is a block diagram illustrating components of the facility in various embodiments. The facility includes a correlating server 202 (e.g., a "Blog a Place" server), Mapping Information server 204, Blog server 206, and a client computer 208. The client computer may additionally have a web browser 210, such as MICROSOFT INTERNET EXPLORER. The servers and client computers may be similar to the computing system environment described above in relation to FIG. 1. These servers and client computers are interconnected via one or more networks 212, such as intranets or the Internet. The facility can include multiple such client computers, servers, and networks. In various embodiments, the servers are software services that execute on one or more server computing devices. In some embodiments, the client computers are portable or handheld computing devices, such as personal digital assistants, cellular telephones, and so forth.

The Blog a Place server provides a web site that the facility can employ to decode information it receives in an encoded URL, provide logic to the client computer, and for other purposes relating to the facility. As an example, the web site decodes geographical location information, description, space ID, and so forth that may be encoded in a URL or other type of link. The web site can also retrieve the blog postings associated with the blog identified by the decoded space ID or cause a browser application to do so. Upon retrieving the blog postings, the web site or browser application may identify geographical locations identified in the blog postings so that the client computer can identify the geographical locations in a list, on a map, on a satellite image, or elsewhere. Thus, the Blog a Place server correlates multiple document types, such as mapping and blogging documents, and so may be referred to as a "correlating server."

The Mapping Information Server provides information relating to geographical areas, such as by providing information that a client computer can employ to display maps or satellite images. The Mapping Information Server can also provide a mechanism for identifying a geographical location that a user identifies in the map or satellite image. As an example, the mechanism can identify a location of a cursor or pointer in terms of latitude and longitude, GPS coordinate information, and so forth. The mechanism can identify locations to a high degree of granularity, such as by using degrees, minutes, seconds, or decimals, or any other coordinate systems. An example of a Mapping Information Server is MSN Virtual Earth.

The Blog Server provides blogging services. As an example, MSN Spaces provides a blogging service that enables users to create a blog space in which they or others can add comments or other information in blog postings. These blog postings can together form an ongoing conversation. A blog (e.g., a space) can be identified by a URL or a space ID.

A user operates the client computer to view maps or satellite images, add blog postings, and generally interact with the facility's servers. In various embodiments, the user may operate the client computer to interact with the facility via a web browser or any other software program.

Although FIG. 2 and the discussion above indicate the use of clients and servers, the services provided by these computing devices can be combined or separated into one or more computing devices.

FIGS. 3A-3D are display diagrams illustrating examples of a user interface of the facility in various embodiments. These figures illustrate a satellite image in accordance with various aspects of the facility. The described concepts can readily be extended to maps.

Figure 3A:
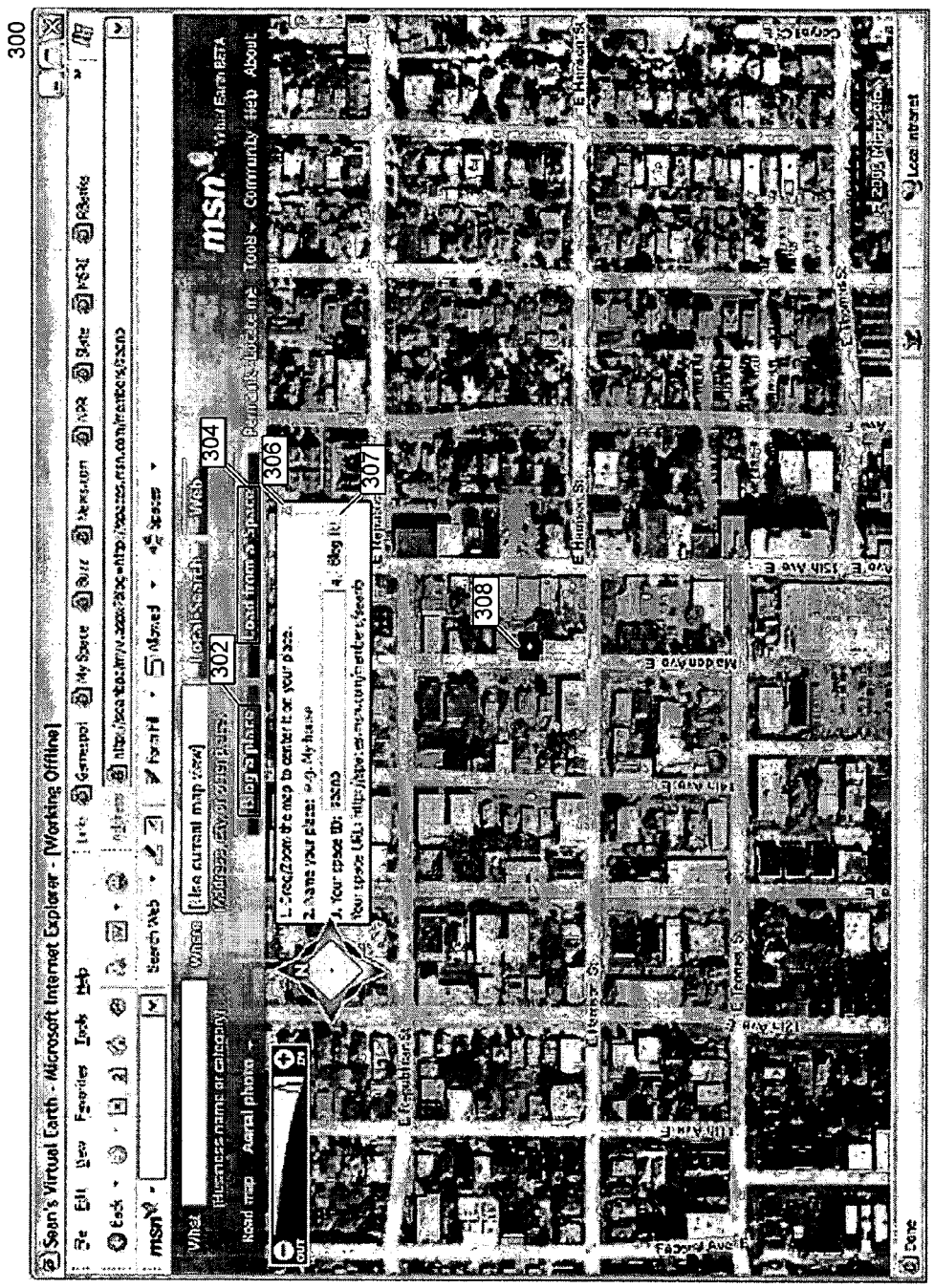
Figure 4:
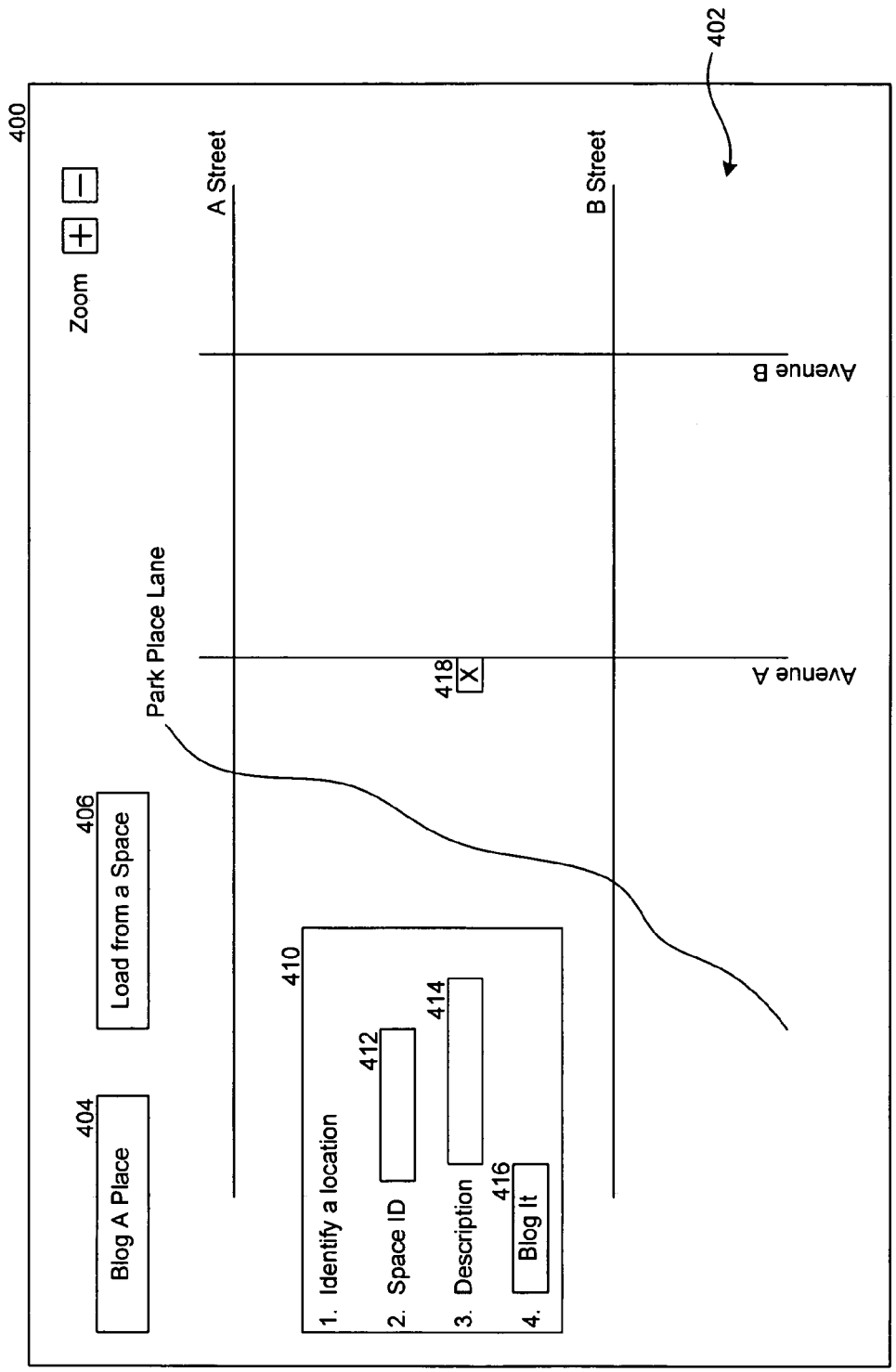
FIG. 4 is a display diagram illustrating another example of a user interface of the facility in some embodiments.

In FIG. 3A, a browser displays a satellite image 300 of a portion of a city. A user can cause a client computer to display a map or satellite image by navigating a browser to a URL associated with a Mapping Information Server. The facility could also display a map, such as is illustrated in FIG. 4 and described in detail below. The browser further displays a "Blog a place" region 302 and a "Load from a Space" region 304. The "Blog a place" region and the "Load from a Space" region can be user interface elements for interacting with the facility, such as pushbuttons or images representing pushbuttons. A user can select the "Blog a place" region to add a geographical location to a blog. Upon selecting the "Blog a place" region, the browser may retrieve user interface elements from a Blog a Place server, such as to superimpose various user interface elements associated with the facility on the satellite image. In some embodiments, the browser retrieves these user interface elements from the Blog a Place server when it retrieves the satellite image or map from the Mapping Information Server or at other times. As examples, the browser may retrieve a region 306 that enables the user to provide a description and space ID, a pointer region 308 that enables the user to identify a geographical location, and other user interface elements that are not illustrated. The region 306 thus provides and collects information, such as in a window, and may additionally have a Blog It region 307 to enable the user to submit the description, space ID, or other information for adding an identified geographical location to a blog posting. The Blog It region can be a user interface element for interacting with the facility, such as a pushbutton or an image representing a pushbutton. In various embodiments, the user can identify a geographical location by dragging the displayed map or satellite image so that the geographical location appears below the pointer region, by positioning the pointer region above or near the geographical location, or other common user interactions associated with maps or images. When the user selects the Blog It region, the facility may invoke a routine, such as the Blog It routine described in detail below in relation to FIG. 6, to add an indication of the identified geographical location and possibly other attributes (e.g., zoom setting, description, etc.) to another document.

Figure 3B:
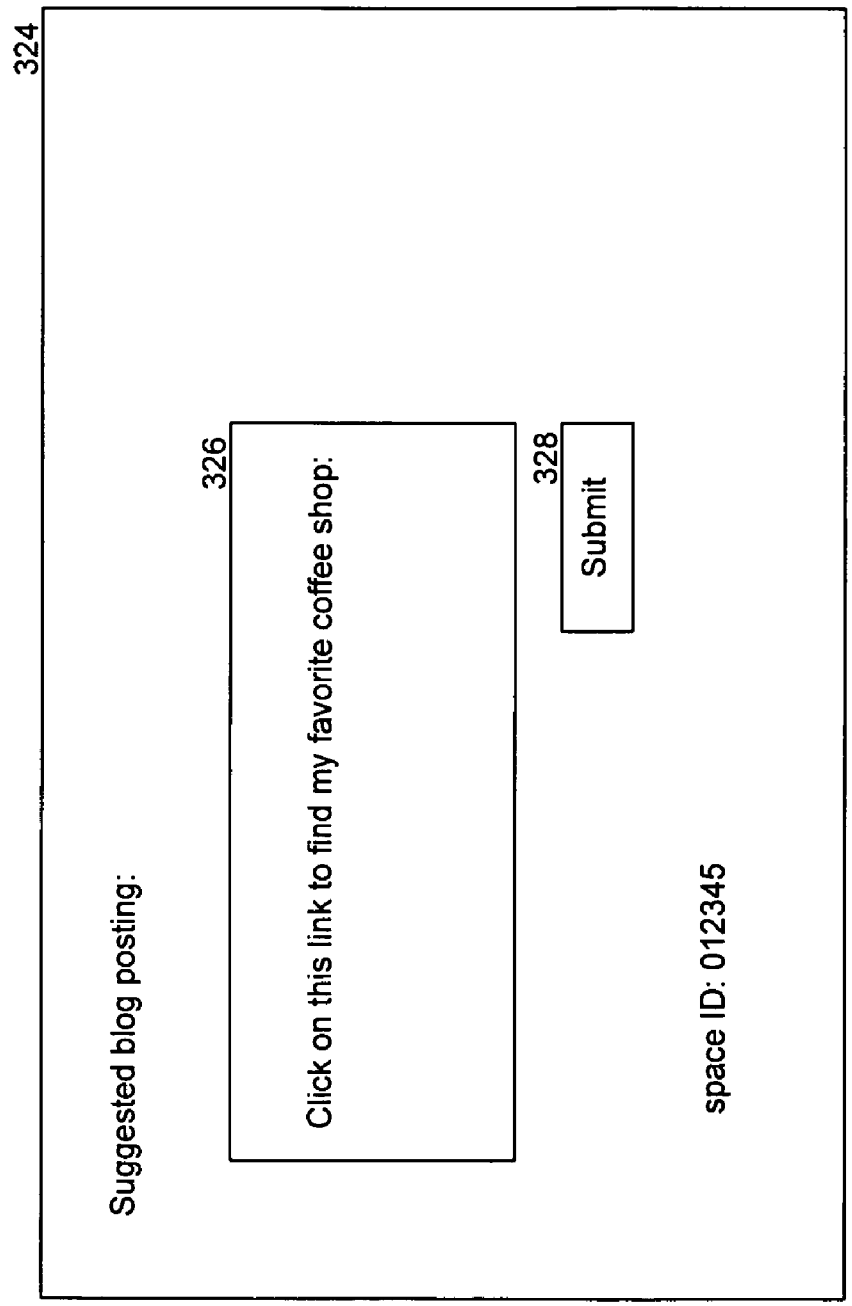

In FIG. 3B, the facility provides a suggested blog posting, such as in a browser page or dialog box 324. The browser page or dialog box includes a region 326 containing the suggested blog posting, which the user can revise. The suggested blog posting is "Click on this link to find my favorite coffee shop:." The user may revise this to include, for example, additional descriptive text relating to the coffee shop. Upon completing the revision, the user can complete the blog posting, such as by selecting a Submit region 328.

FIG. 3C illustrates a portion of a blog 330 containing a blog posting made on January 8 followed by a blog posting made on January 9 that contains the encoded URL. If a user viewing the blog selects the encoded link, a browser window opens containing the identified geographic location, as illustrated in FIG. 3D and described immediately below.

Figure 3D:
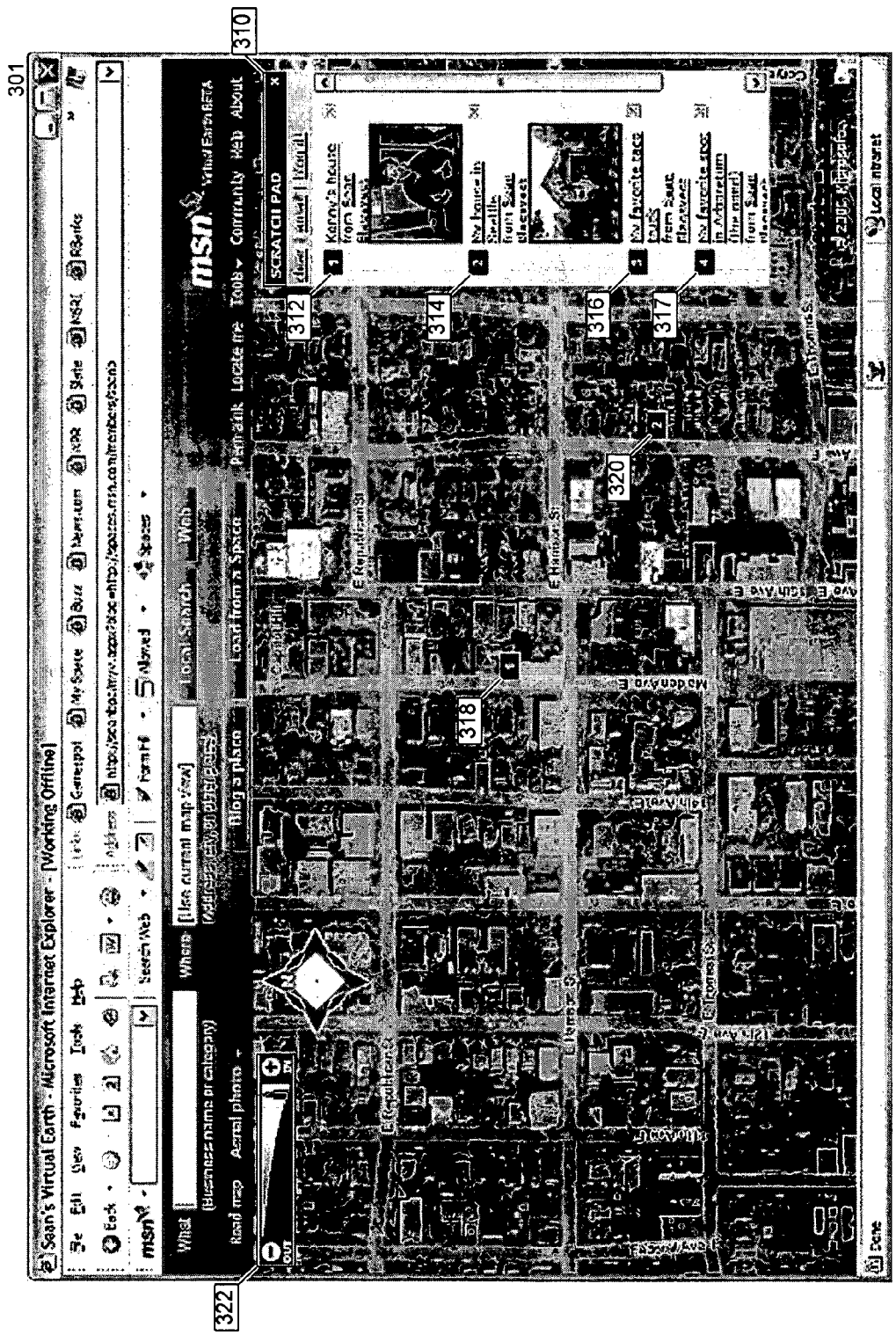

In FIG. 3D, a browser displays a satellite image 301 along with a list region 310. The list region can be a window or other user interface element that the facility can use to provide a list of geographical locations that it identified in postings of a blog. In some embodiments, a scratch pad of the Mapping Information Server's user interface provides the list, such as the scratch pad illustrated in the figure. The list illustrated in the list region indicates that positions 312, 314, and 316 were identified in a specified blog. The list region may also indicate other geographical locations or other information 317. As an example, the facility may add a nearby geographical location to the list that, although does not appear in the blog, may nonetheless be relevant (e.g., a nearby restaurant, store, etc.). The list region may be scrollable, such as when the number of items in the list exceeds the available screen space occupied by the list region. The facility may further identify these geographical locations in the satellite image or map, such as at regions 318 and 320. Regions 318 and 320 identify locations that may be correlated with the information in the list by numbers, letters, symbols, or by using other techniques. As an example, region 318 is correlated with region 312 of the list using the number "1" in blocks inside both regions. Similarly, region 320 is correlated with region 314 of the list using the number "2" in blocks inside both regions. Regions 316 and 317 may not appear on the map or satellite image because they are too distant from the area depicted in the browser. In such a case, the user can "zoom out" by using a zoom region 322, pan the map or satellite image (such as by using a dragging operation), or select the regions from the list to view these additional geographical locations.

FIG. 4 is a display diagram illustrating another example of a user interface of the facility in some embodiments. The user interface 400 is similar to the user interface depicted in FIG. 3A. However, the user interface depicts a map 402 rather than a satellite image. A "Blog A Place" region 404 is similar to region 302. A "Load from a Space" region 406 is similar to region 304. A user interface region 410 is similar to region 306. The user interface region contains instructions for identifying a region, and regions 412 and 414 to receive input relating to a space ID and a description, respectively. The user interface region also contains a "Blog It" region 416 that is similar to region 307. The user interface 400 additionally has a pointer region 418 that is similar to region 308. The regions of FIG. 4 are similar in appearance and functionality to the corresponding regions of FIG. 3A.

Figure 5:
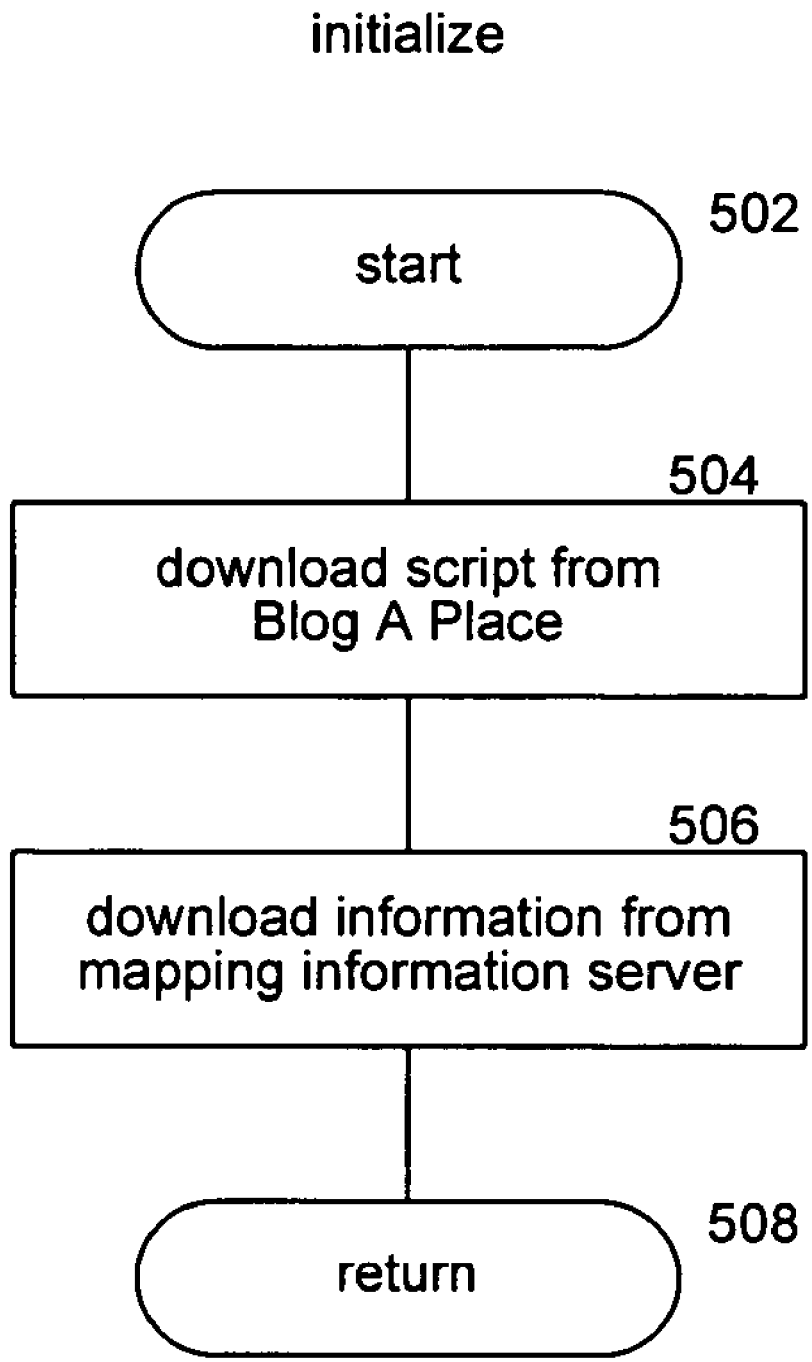
FIG. 5 is a flow diagram illustrating an initialize routine invoked by the facility in some embodiments.

FIG. 5 is a flow diagram illustrating an initialize routine invoked by the facility in some embodiments. The facility may invoke the routine as part of an initialization process when a browser retrieves a map or a satellite image, browses to an encoded URL, accesses the Blog a Place server, or otherwise accesses the facility. As an example, the facility may invoke the routine to retrieve user interface elements and client-side script for interacting with a "Blog a Place" server. The routine begins at block 502.

At block 504, the routine downloads client-side script from the "Blog a Place" server. In various embodiments, the script enables the facility to encode geographical location information, descriptions, and so forth. The script or other logic associated with the Blog a Place server may also enable the facility to save information to a blog, retrieve information from a blog, decode information contained in a link or URL, and perform other interactions with a blogging server.

At block 506, the routine retrieves mapping or satellite imagery information from the Mapping Information Server. The routine may also retrieve scripts or other logic so that the user is able to manipulate and properly view the displayed map or satellite image.

At block 508, the routine returns.

Figure 6:
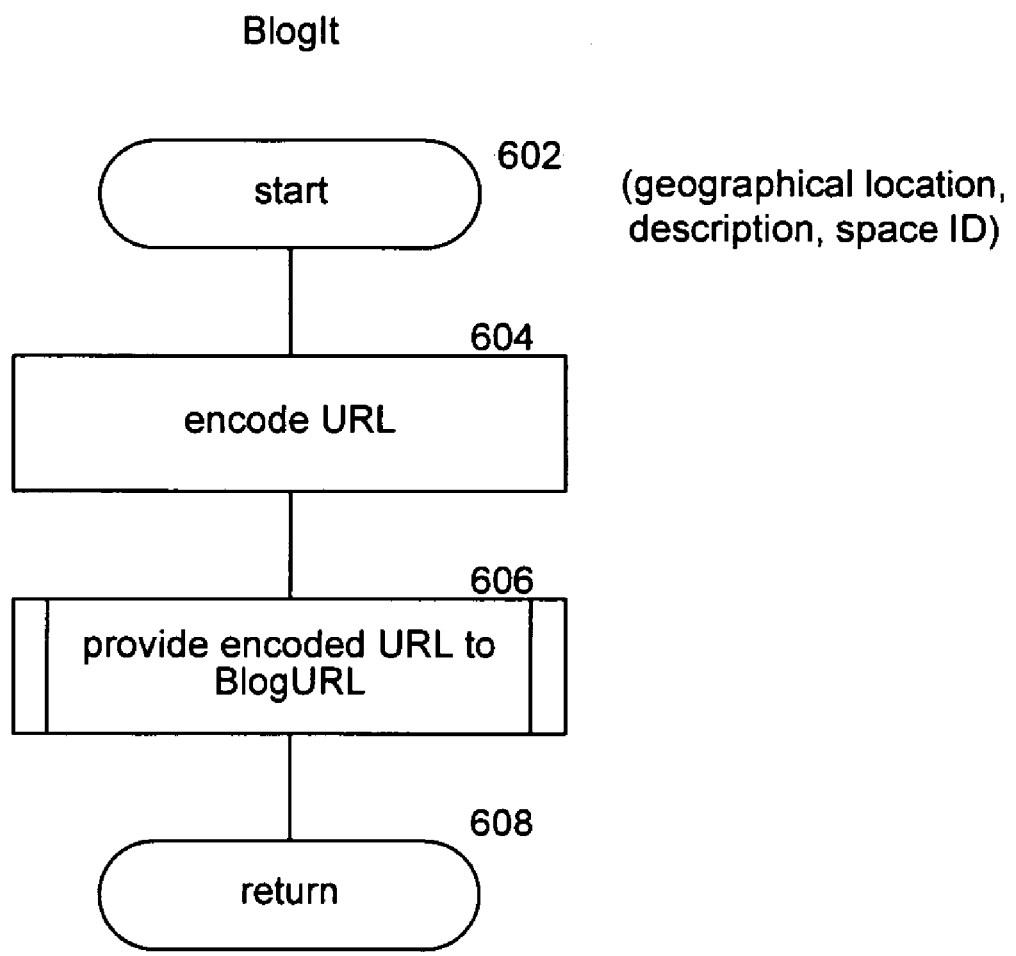
FIG. 6 is a flow diagram illustrating a BlogIt routine invoked by the facility in some embodiments.

FIG. 6 is a flow diagram illustrating a BlogIt routine invoked by the facility in some embodiments. The facility may invoke the BlogIt routine to add to a blog an encoded link relating to an identified geographical location. As an example, the facility may invoke the BlogIt routine when the user selects a BlogIt region in the user interface. The routine begins at block 602 where it receives indications of a geographical location, description, and blog (e.g., space ID) as parameters. The routine may also receive an indication of a zoom level at which the user is viewing a satellite image or map (not shown).

At block 604, the routine creates an encoded URL. As an example, the routine may encode the URL by identifying the geographical location (e.g., by specifying a latitude/longitude or GPS coordinates), description, and space ID as portions of a query string for a URL that suggests a blog posting. The routine may also encode the zoom level. A query string of a URL is the portion of the URL following a question mark that is appended to the end of a URL identifying a document. As an example, if the URL identifies the document as XXX.YYY.ZZZ/document, a query string can be appended to create a new URL as follows: XXX.YYY.ZZZ/document?querystring. An example of the query string encoding a geographical location, description, and space ID is: lat=012345&long=987654&desc=MyHouse&ID=121234 where "lat" is latitude, "long" is longitude, "desc" is description, and "ID" is a space ID. As previously mentioned, the facility could use GPS (or any other) coordinates instead of latitude and longitude.

At block 606, the routine provides the encoded URL to a BlogURL subroutine to upload a blog posting. The BlogURL subroutine is described in further detail below in relation to FIG. 7.

At block 608, the routine returns.

In various embodiments, the routine enables the geographic information to be stored in various computing devices, such as by using script or other logic to store geographic information at a server.

Figure 7:
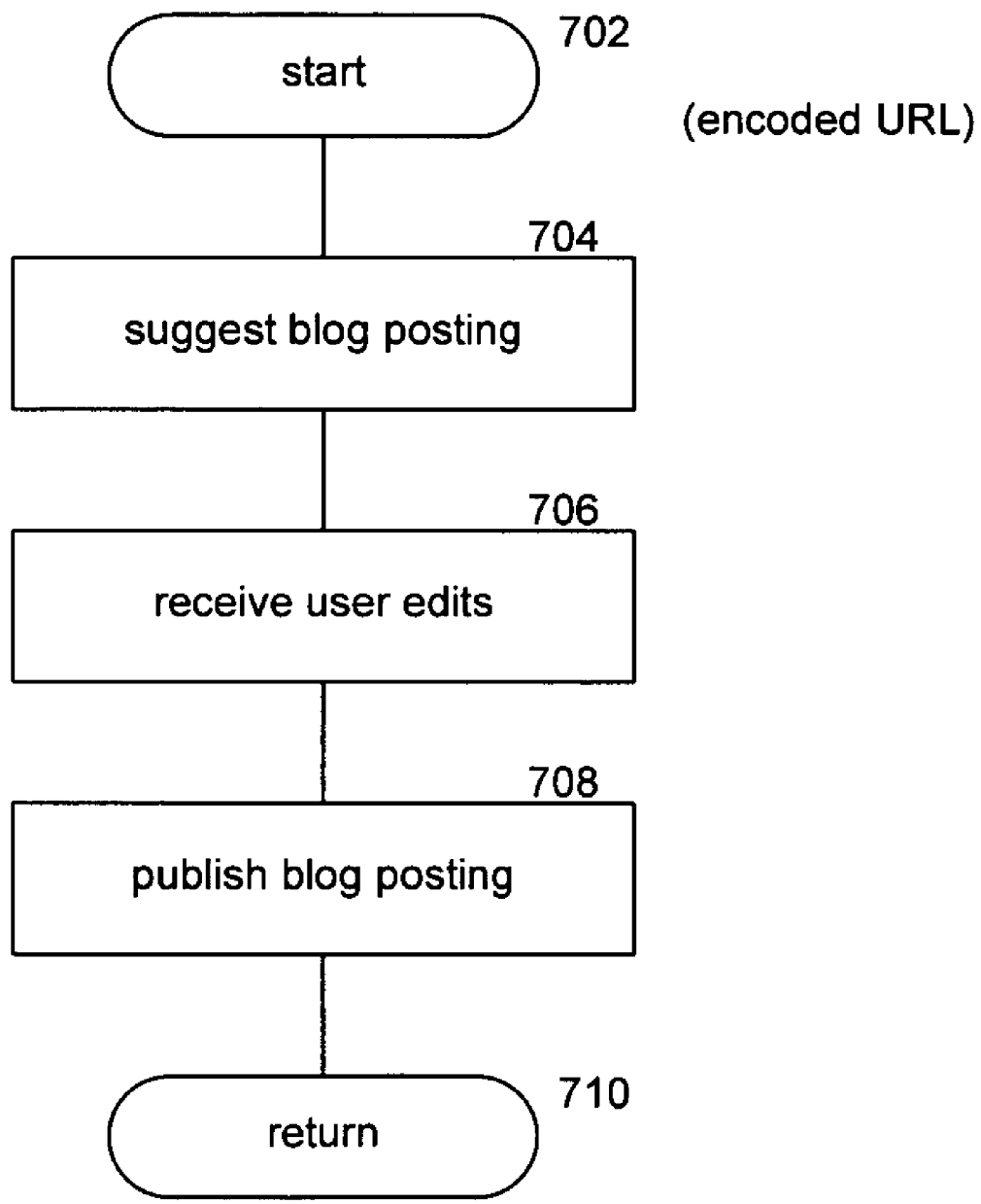
FIG. 7 is a flow diagram illustrating a BlogURL routine invoked by the facility in some embodiments.

FIG. 7 is a flow diagram illustrating a BlogURL routine invoked by the facility in some embodiments. The BlogURL routine may be invoked by the BlogIt routine to upload a blog posting after a user identifies a geographical location to add to a blog. The routine begins at block 702 where it receives an indication of an encoded URL as a parameter.

At block 704, the routine suggests a blog posting based on the encoded URL it receives. As an example, the routine may suggest text such as "Find this geographical location by clicking here:" followed by a URL associated with the map or satellite image location. In various embodiments, the text can include the description provided by the user and other information. The routine may provide a web form that the user can use to edit the proposed blog posting. As an example, the routine may provide user interface controls such as text boxes to receive additional text or options from the user.

At block 706, the routine receives the user's input and edits to the proposed blog posting. As an example, the routine may receive text that the user desires to add to the blog posting.

At block 708, the routine publishes the blog posting. As an example, the routine may send information to the blog server, including a space ID, so that the blog server can add the blog posting to the indicated blog.

At block 710, the routine returns. Upon completion of the routine, the indicated blog may have a new blog posting containing at least a link (e.g., an encoded URL) whose target is a document identifying the geographical location that was selected by the user for adding to the blog. When a viewer of the blog selects the link, the browser can load a map or satellite image and identify the selected geographical location. In various embodiments, the link also defines a zoom level selected by the user and includes one or more of the properties encoded with the URL, such as the description and so forth.

Figure 8:
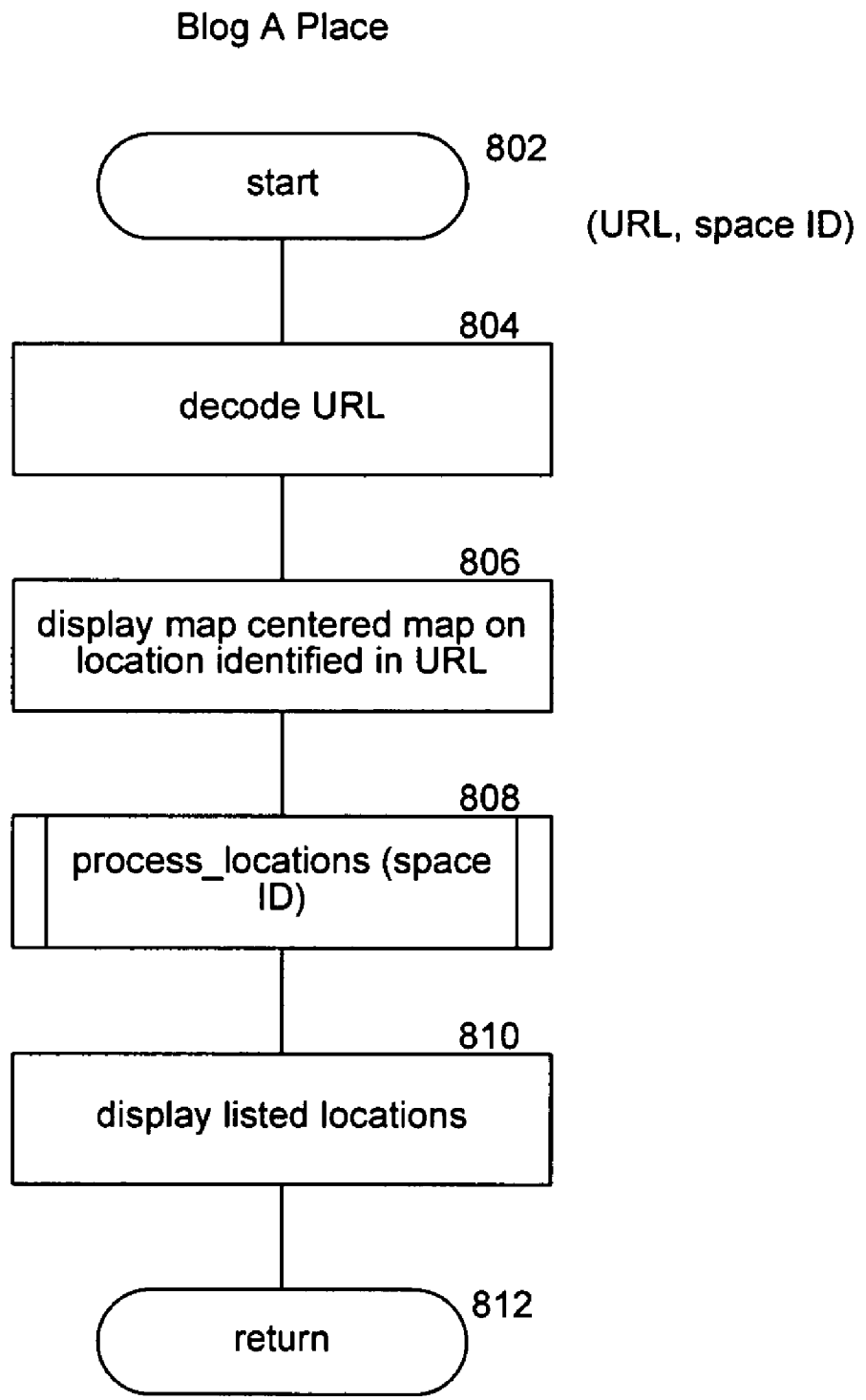
FIG. 8 is a flow diagram illustrating a BlogAPlace routine invoked by the facility in some embodiments.

FIG. 8 is a flow diagram illustrating a BlogAPlace routine invoked by the facility in some embodiments. The facility may invoke the routine when a user selects an encoded URL or other link in a blog that identifies a geographical location. The routine begins at block 802 where it receives an indication of a URL and a space ID as parameters. As an example, the routine may receive the encoded URL. In various embodiments, the encoded URL may contain the space ID, in which case the additional space ID parameter may be unnecessary.

At block 804, the routine decodes the URL. As an example, the routine may decode from the received URL a latitude/longitude or GPS coordinate at which a geographical location identified by the encoded URL is situated, a zoom level at which to display the map, and other properties indicated by the URL.

At block 806, the routine displays a map or a satellite image. In various embodiments, the routine may center the map at the geographical location identified by the URL and set a zoom level indicated by the URL.

At block 808, the routine invokes a process_locations subroutine and provides an indication of a blog (e.g., a space ID or a blog URL) from which to retrieve additional geographical locations. The process_locations subroutine is described in further detail below in relation to FIG. 9.

At block 810, the routine displays the additional geographical locations indicated by the process_locations subroutine. As an example, the routine may display the additional geographical locations in a list region or scratch pad.

At block 812, the routine returns.

Figure 9:
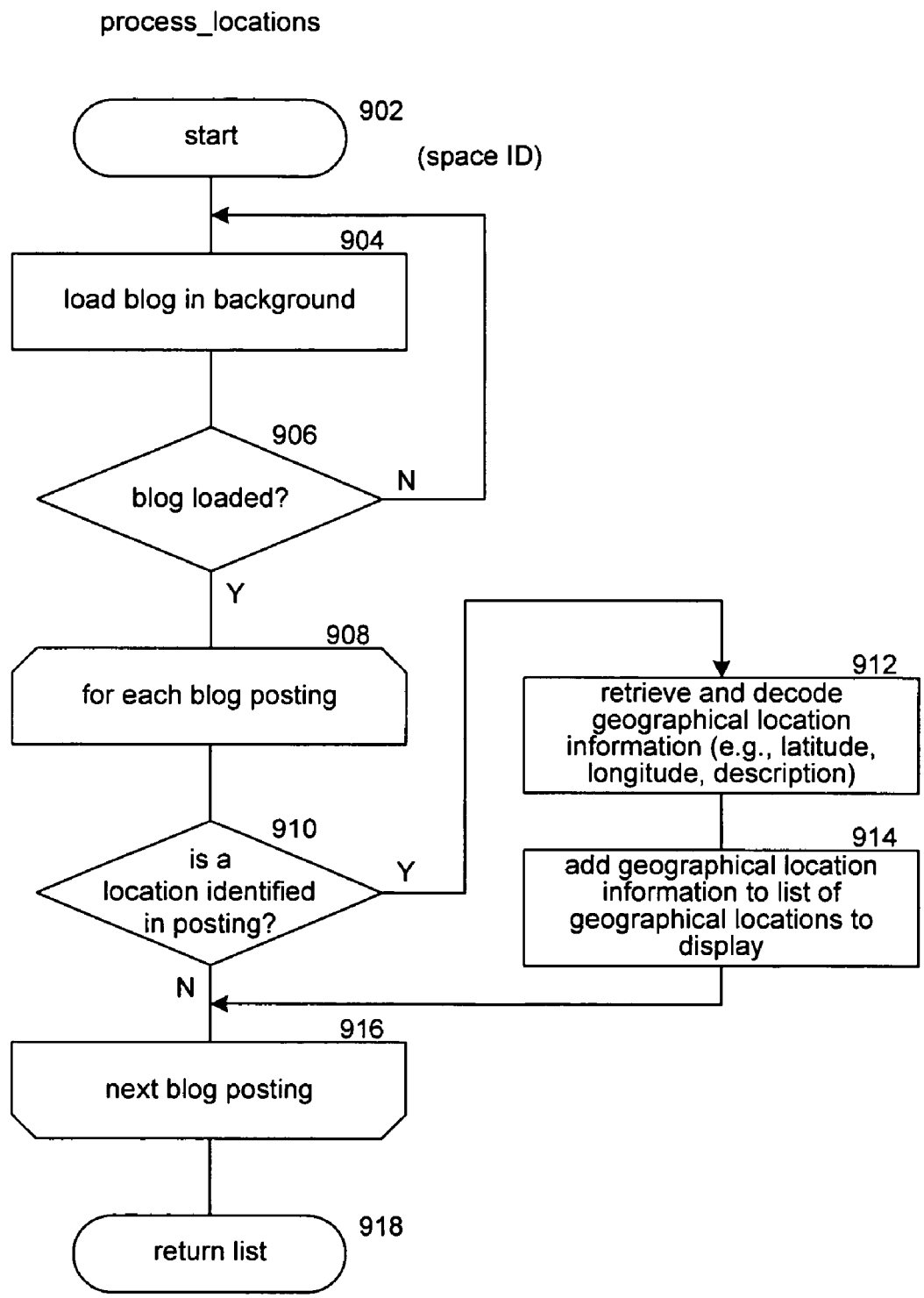
FIG. 9 is a flow diagram illustrating a process_locations routine invoked by the facility in some embodiments.

FIG. 9 is a flow diagram illustrating a process_locations routine invoked by the facility in some embodiments. The facility may invoke the routine to process geographical locations identified in postings in a blog. The routine begins at block 902 where it receives an indication of a blog as a parameter, such as a space ID.

At block 904, the routine loads the identified blog in the background. As an example, an ActiveX control or script associated with the web page that displays the map (or satellite image) and the geographical locations loads the blog in the background.

At block 906, the routine determines whether the blog has been completely loaded, such as by checking whether the blog is "well-formed" XML or RSS (known alternatively as Rich Site Summary, Really Simple Syndication, or other terms used in the art to identify a blog storage format). When the blog has not been completely loaded, the routine continues at block 904. Otherwise, the routine continues at block 908.

Between the loop of blocks 908-916, the routine processes any geographical location information identified in the blog postings, such as by using encoded URLs. At block 908, the routine selects a blog posting.

At block 910, the routine determines whether the selected blog posting contains geographical location information. As an example, the routine may determine whether the blog posting contains a link, such as an encoded URL. If the selected blog posting contains geographical location information, the routine continues at block 912. Otherwise, the routine continues at block 916.

At block 912, the routine retrieves and decodes the geographical location information contained in the link or encoded URL. The geographical location information may identify a latitude/longitude, GPS coordinate, and so forth.

At block 914, the routine adds the decoded geographical information to a list of geographical locations that will be displayed, such as in a list region or scratchpad.

At block 916, the routine selects another blog posting. If all blog postings have been processed in the loop, the routine continues at block 918 where it returns the list. Otherwise, the routine continues at block 910.

In some embodiments, the facility enables mutual linking between any two documents. In particular, a document associated with a first application (e.g., a blogging application) contains a link to a specific portion of a document associated with a second application (e.g., a mapping application) and this document of the second application contains one or more links to the document associated with the first application. The facility can add an encoded link to any application that provides an application program interface (API) for the facility to add the encoded link. As an example, the facility may be able to add an encoded link to a MICROSOFT WORD document by using MICROSOFT WORD's API. The facility may likewise be able to retrieve encoded links from MICROSOFT WORD documents by using the API.

Those skilled in the art will appreciate that the steps shown in FIGS. 5-9 and discussed above may be altered in various ways. For example, the order of the logic may be rearranged, substeps may be performed in parallel, illustrated logic may be omitted, additional logic may be included, etc.

It will be appreciated by those skilled in the art that the above-described facility may be straightforwardly adapted or extended in various ways. As an example, the facility may be used with various applications and documents. As another example, the facility may employ encoding of various information in addition to, or instead of, geographical location information. While the foregoing description makes reference to particular embodiments, the scope of the invention is defined solely by the claims that follow and the elements recited therein.

We claim:

1. A method performed by a computer system for cross-application encoding of geographical location information, comprising:
    receiving a first document comprising a map or satellite image indicating information relating to a geographical area;
    displaying on a computer screen an image representing the geographical area, the displaying performed by a first application;
    receiving input from a user identifying a geographical location that is located in the geographical area;
    encoding, by the first application, the identified geographic location to create an encoded link and creating an encoded URL that is encoded with an identification of a blog, wherein the encoded URL indicates a zoom level of the displayed image; and
    causing, by the first application, the encoded link to be added to a second document associated with a second application different from the first application such that when the encoded link is selected in the second application, the selection causes the first application to display the geographical area and identify the geographical location, the second document associated with a second application, wherein the second application is configured to retrieve a blog having multiple blog postings.

2. The method of claim 1 wherein the displaying is performed by a browser that invokes a mapping application.

3. The method of claim 1 wherein the encoded URL indicates a latitude and longitude of the identified geographical location.

4. The method of claim 3 wherein the encoded URL further indicates a description provided by the user in relation to the identified geographical location.

5. A computer-readable storage device storing computer-executable instructions that, when executed, perform a method of cross-application encoding of geographical location information by a second application, the method comprising:
    receiving by the second application a link encoded by a first application, the encoded link containing an encoding of at least an indication of a geographical location, wherein the encoded link specifies a geographical location by using an encoded URL;
    the second application causing the first application to display a portion of a first document that defines a geographical area, the geographical area containing the indicated geographical location;
    retrieving a second document comprising a blog having multiple postings, at least one of the blog postings having one or more indications of geographical locations, the second document associated with the second application;
    displaying a list of the geographical locations indicated in the second document; and
    identifying at least one of the indicated geographical locations on the geographical area displayed by the first application.

6. The computer-readable device of claim 5 wherein the receiving includes receiving an encoded link identifying a geographical location by its latitude and longitude.

7. The computer-readable device of claim 5 wherein the causing includes causing a mapping application to display a portion of a map.

8. The computer-readable device of claim 5 wherein the retrieving includes retrieving blog postings from multiple blogs.

9. The computer-readable device of claim 5 wherein the encoded link identifies the second document.

10. The computer-readable device of claim 5 wherein the first application and the second application both execute at a client computing device.

11. The system of claim 5 wherein the first application and the second application both execute at a client computing device.

12. A system for cross-application encoding of geographical location information, comprising:
    a component configured to receive a first document comprising a map or satellite image indicating information relating to a geographical area;
    a first application configured to display on a computer screen an image representing the geographical area;
    a component configured to receive input from a user identifying a geographical location that is located in the geographical area;
    a component configured to encode, by the first application, the identified geographic location to create an encoded link and to create an encoded URL that is encoded with an identification of a blog, wherein the encoded URL indicates a zoom level of the displayed image; and
    a component configured to cause, by the first application, the encoded link to be added to a second document associated with a second application different from the first application such that when the encoded link is selected in the second application, the selection causes the first application to display the geographical area and identify the geographical location, the second document associated with a second application, wherein the second application is configured to retrieve a blog having multiple blog postings.

13. system of claim 12 wherein the first application and the second application both execute at a client computing device.

14. The system of claim 12, wherein the first application and the second application both execute at a client computing.

* * * * *